US008960995B2

(12) United States Patent  (10) Patent No.: US 8,960,995 B2
McCurdy et al.  (45) Date of Patent: Feb. 24, 2015

(54) MIXER/FEEDER APPARATUS AND A DEVICE FOR MONITORING OPERATION OF THE MIXER/FEEDER APPARATUS

(75) Inventors: John Joseph McCurdy, Gowran (IE); Oliver Thomas O'Neill, Bagenalstown (IE); Hugh McNab Kerr, Murthly (GB); Jérôme Jean-Yves Eon, Saint Pierre de Plesguen (FR); Seth Daniel Wareing, Ingleby Barwick (GB); Timothy John Penfare, Fethard (IE)

(73) Assignee: Salford Engineering Limited, Borris, County Carlow (IE)

( * ) Notice: Subject to any disclaimer, the term of this patent is extended or adjusted under 35 U.S.C. 154(b) by 1114 days.

(21) Appl. No.: 12/920,835
(22) PCT Filed: Mar. 6, 2009
(86) PCT No.: PCT/IE2009/000007
§ 371 (c)(1), (2), (4) Date: Dec. 2, 2010
(87) PCT Pub. No.: WO2009/109954
PCT Pub. Date: Sep. 11, 2009

(65) Prior Publication Data
US 2011/0112688 A1  May 12, 2011

(30) Foreign Application Priority Data

Mar. 6, 2008 (IE) .................... S2008/0172
Dec. 3, 2008 (IE) .................... S2008/0961

(51) Int. Cl.
*A01K 5/00* (2006.01)
(Continued)

(52) U.S. Cl.
CPC . *A23K 3/02* (2013.01); *A01K 5/002* (2013.01);
(Continued)

(58) Field of Classification Search
CPC .................. A01K 5/002; B01F 15/00194
USPC ...................... 366/141, 142, 603; 241/101.76
See application file for complete search history.

(56) References Cited

U.S. PATENT DOCUMENTS 3,395,019 A  7/1968  Kviesitis et al.
(Continued)

FOREIGN PATENT DOCUMENTS

DE  20105747 U1  8/2002
(Continued)

OTHER PUBLICATIONS

Machine generated English translation of Detailed Description of JP 11-056153, generated Apr. 8, 2014.*
(Continued)

*Primary Examiner* — David Sorkin
(74) *Attorney, Agent, or Firm* — Sughrue Mion, PLLC

(57) ABSTRACT

A mixer/feeder wagon (1) for mixing and dispensing batches of animal feed comprises a device (50) for monitoring operation of the mixer/feeder wagon (1) and for determining instants during a mixing cycle during which ingredients of the animal feed are to be loaded into the mixer/feeder wagon (1). The mixer/feeder wagon (1) comprises a mixing compartment (14) within which a paddle mixer (17) is rotatable for mixing the ingredients of the batch of animal feed therein. Load sensors (9) produce signals indicative of the current weight of the ingredients in the mixing compartment (14) which are read by a microprocessor (55) of the device (50). A proximity sensor (38) counts the number of revolutions of the paddle mixer 17. Particulars of the ingredients of the batch of animal feed together with the weights of the respective ingredients are stored in a RAM (56) in the device (50) as well as the instants during a mixing cycle at which the respective ingredients are to be loaded into the mixing compartment (14) based on the count of revolutions of the paddle mixer (17) from the commencement of the mixing cycle. The microprocessor (55) in response to signals from the proximity sensor (38) outputs a signal to activate a siren (67) to indicate when the next ingredient is to be loaded into the mixing compartment (14). The identities of the respective ingredients as they are to be loaded into the mixing compartment (14) are displayed on a visual display screen (54) together with the weights thereof.

19 Claims, 4 Drawing Sheets

Figure 1:
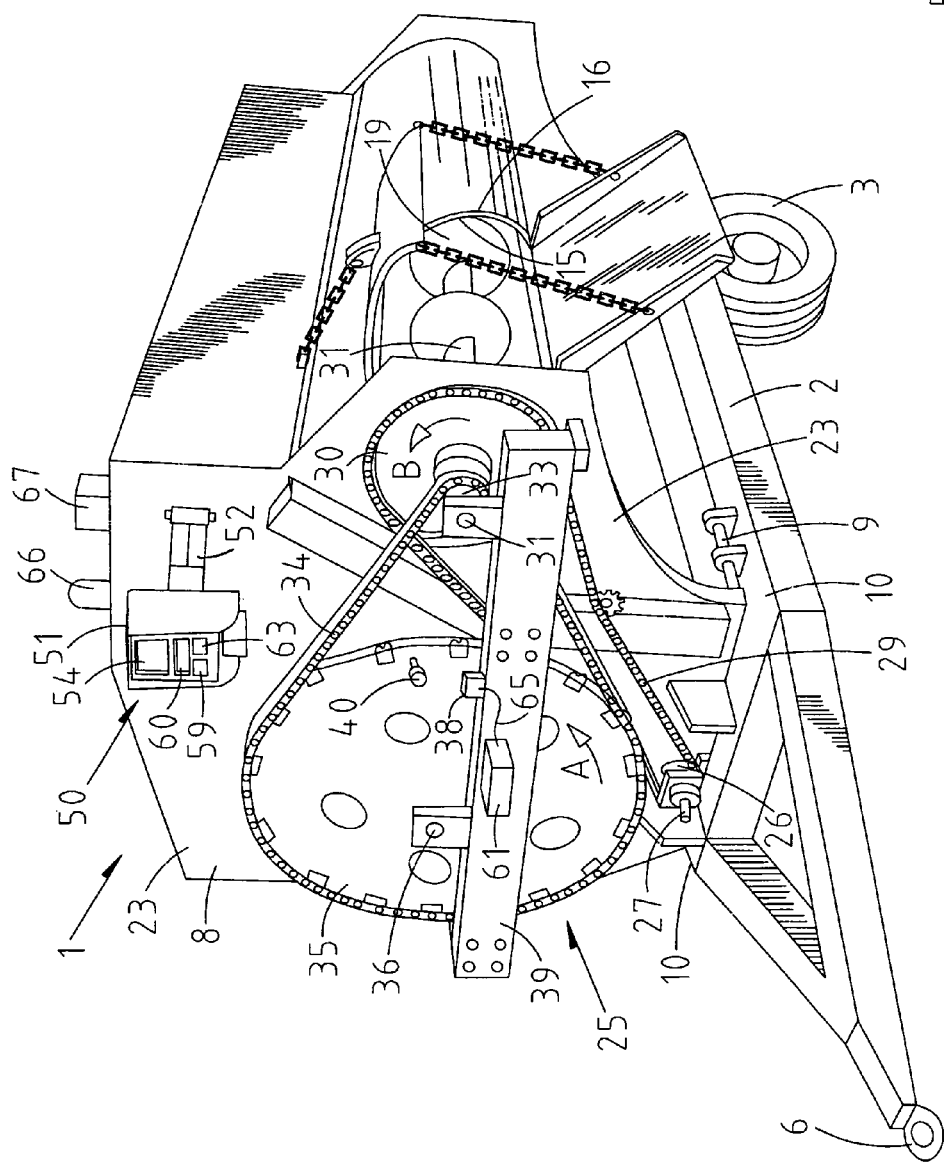

(51) Int. Cl.
  A23K 3/02    (2006.01)
  *A23K 1/12*    (2006.01)
  *A23K 1/14*    (2006.01)

(52) U.S. Cl.
  CPC . *A23K 1/12* (2013.01); *A23K 1/146* (2013.01); *Y10S 366/603* (2013.01)
  USPC ....... 366/141; 366/142; 366/603; 241/101.76

(56) References Cited

U.S. PATENT DOCUMENTS

| | | | |
|---|---|---|---|
| 3,608,869 A * | 9/1971 | Woodle | 366/132 |
| 3,822,056 A * | 7/1974 | Hawes et al. | 366/114 |
| 3,843,099 A * | 10/1974 | Duncan | 366/76.2 |
| 4,547,660 A | 10/1985 | Whitson | |
| 4,733,971 A * | 3/1988 | Pratt | 366/141 |
| 4,889,433 A * | 12/1989 | Pratt | 366/141 |
| 5,087,128 A | 2/1992 | Matthews et al. | |
| 5,340,211 A | 8/1994 | Pratt | |
| 5,503,868 A | 4/1996 | Fallin et al. | |
| 2002/0101781 A1 | 8/2002 | Bump | |
| 2007/0233147 A1 | 10/2007 | Vendrely et al. | |

FOREIGN PATENT DOCUMENTS

| | | |
|---|---|---|
| EP | 0931454 A1 | 7/1999 |
| IE | 960 301 A2 | 10/1996 |
| JP | 7-163260 A | 6/1995 |
| JP | 10-136824 A | 5/1998 |
| JP | 11-9127 A | 1/1999 |
| JP | 11-56153 | 3/1999 |
| JP | 11-505413 A | 5/1999 |
| JP | 2003-158934 A | 6/2003 |
| JP | 2007-244868 A | 9/2007 |
| JP | 2003-9700 A | 1/2013 |
| WO | 96/32836 A1 | 10/1996 |

OTHER PUBLICATIONS

International Search Report for PCT/IE2009/000007 mailed Dec. 16, 2009.

Japanese Office Action for corresponding Japanese Application No. 2010-549249 dated Feb. 25, 2013, with English translation.

* cited by examiner

MIXER/FEEDER APPARATUS AND A DEVICE FOR MONITORING OPERATION OF THE MIXER/FEEDER APPARATUS

The present invention relates to a mixer/feeder apparatus, and in particular, though not limited to a mixer/feeder wagon of the type used for preparing a batch of animal feed from a plurality of ingredients. The invention also relates to a device for use in conjunction with a mixer/feeder apparatus for monitoring operation of the mixer/feeder apparatus and for determining instants during a mixing cycle of a batch of animal feed at which respective ingredients of the animal feed are to be loaded into the mixer/feeder apparatus.

Mixer/feeder apparatus, and in particular, mixer/feeder wagons for preparing a batch of animal feed from ingredients are well known. For example, such mixer/feeder wagons are disclosed in PCT Published Application Specification No. WO 96/32836 of the present applicant and British Patent Specification No. 2,139,911. Typically, such mixer/feeder wagons comprise a mixing compartment in which the ingredients are homogenously mixed, and a dispensing compartment from which the mixed ingredients are dispensed. A mixing rotor, which typically is a paddle mixer, is rotatably located in the mixing compartment for mixing the ingredients of the animal feed therein. The mixer/feeder wagon disclosed in PCT published Application Specification No. WO 96/32836 comprises chopping blades located in the lower portion of the mixing compartment which co-operate with mixing paddles of the mixing rotor as the mixing rotor rotates for chopping fibrous ingredients into desirable lengths.

Typically, the animal feed comprises fibrous ingredients, such as, for example, long or short cut silage, hay, straw, maize, maize silage, wheat, oats, soda grain, sugar beet. Other ingredients of such animal feeds include additives and concentrates, for example, mineral additives and concentrates, energy additives and concentrates and liquids.

It has been found that selecting of the types of ingredients of a batch of animal feed, and in particular, selecting the proportions of the ingredients which make up the animal feed is important in order to obtain optimum results from animals fed with the animal feed. It has also been found that the duration of a mixing cycle to which animal feed is subjected in a mixer/feeder wagon or other mixer/feeder apparatus is also important in producing an animal feed to produce optimum yields from animals fed with the animal feed. In particular, it is important to avoid both over-mixing and under-mixing of animal feed. Under-mixing results in the ingredients not being homogenously mixed, and thus, animals can subsequently pick and choose the more tasty ingredients of the animal feed, thus leaving the less tasty ingredients behind. Over-mixing can result in deterioration of the nutritional value of the animal feed, and in particular can result in deterioration of the fibrous material, and its properties of stimulating digestion of the nutrients in the animal feed in the animal's stomach. This is particularly so in the case of ruminants, such as beef cattle and milking and dry cows. In mixer/feeder wagons which include a chopping facility such as the mixer/feeder wagon disclosed in PCT published Application Specification No. WO 96/32836 whereby the ingredients of the animal feed are simultaneously subjected to chopping and mixing, over-mixing, particularly of the fibrous ingredients, can result in the fibrous materials being over-chopped, thus resulting in the fibrous ingredients in the mixed animal feed being of lengths which are too short to stimulate optimum digestion of the nutrients in the animal's stomach. Under-mixing of fibrous material in the mixer/feeder wagon disclosed in PCT published Application Specification No. WO 96/32836 as well as producing an animal feed which is inadequately mixed also results in some of the fibrous material of the animal feed being of excessive lengths.

There is therefore a need for a mixer/feeder apparatus for preparing a batch of animal feed from a plurality of ingredients which addresses the problem of over-mixing and under-mixing of the ingredients.

The present invention is directed towards providing such a mixer/feeder apparatus, and the invention is also directed towards providing a device for use in conjunction with a mixer/feeder apparatus for monitoring operation of the mixer/feeder apparatus and for determining instants during a mixing cycle of a batch of animal feed at which respective ingredients of the animal feed are to be loaded into the mixer/feeder apparatus.

According to the invention there is provided a device for use in conjunction with a mixer/feeder apparatus for monitoring operation of the mixer/feeder apparatus and for determining instants during a mixing cycle of a batch of animal feed at which respective ingredients of the animal feed are to be loaded into the mixer/feeder apparatus, the device comprising:

a first storing means, the first storing means being configured to store data indicative of the identities of the respective ingredients of the batch of animal feed, the proportions of the respective ingredients required to produce the batch of animal feed, the instants during the mixing cycle of the batch of animal feed at which the respective ingredients are to be loaded into the mixer/feeder apparatus, and the duration of the mixing cycle, a signal processing means responsive to the stored data in the first storing means for sequentially producing first signals indicative of the identities of the ingredients and the weights thereof in the sequence in which the ingredients are to be loaded into the mixer/feeder apparatus during the mixing cycle, the signal processing means being responsive to the data stored in the first storing means and to signals indicative of the operation of the mixer/feeder apparatus for sequentially producing second signals to identify the instants at which the respective ingredients are to be loaded into the mixer/feeder apparatus during the mixing cycle, and a display means responsive to the first signals for sequentially displaying the identities of the ingredients in the sequence in which the ingredients are to be loaded into the mixer/feeder wagon during the mixing cycle.

Preferably, the display means is responsive to the second signals to produce respective visually perceptible signals indicative of the instants at which the respective ingredients are to be loaded into the mixer/feeder apparatus.

Advantageously, the signal processing means is responsive to the data stored in the first storing means and to the signals indicative of the operation of the mixer/feeder apparatus for producing a mixing cycle complete signal on completion of the mixing cycle.

In one embodiment of the invention the display means is responsive to the mixing cycle complete signal produced by the signal processing means for producing a visually perceptible signal indicative of the mixing cycle having been completed.

In another embodiment of the invention the signal processing means is responsive to one of the signals indicative of the operation of the mixer/feeder apparatus which is indicative of a function of mixing by the mixer/feeder apparatus during the mixing cycle for producing the second signals. Preferably, the signal processing means is responsive to the signal indicative of a function of mixing by the mixer/feeder apparatus which is indicative of the number of revolutions of a mixing means of the mixer/feeder apparatus for producing the second signals. Advantageously, the signal processing means is responsive to the signal indicative of the number of revolutions of the mixing means of the mixer/feeder apparatus which is indicative of the number of revolutions of a mixing rotor of the mixer/feeder apparatus for producing the second signals.

In another embodiment of the invention the signal processing means is responsive to the signals indicative of the operation of the mixer/feeder apparatus for producing a duration countdown signal on the second signal being indicative of the instant at which the last of the ingredients of the batch of animal feed is to be loaded into the mixer/feeder apparatus for counting down the remaining duration of the mixing cycle to the completion thereof. Preferably, the duration countdown signal produced by the signal processing means is indicative of the remaining number of revolutions of the mixing means of the mixer/feeder apparatus to which the ingredients of the animal feed are to be subjected to the completion of the mixing cycle. Advantageously, the display means is responsive to the duration countdown signal for displaying the duration of the mixing cycle remaining in a countdown manner.

In one embodiment of the invention the signal processing means is responsive to the signals indicative of the operation of the mixer/feeder apparatus for producing a first warning signal indicative of the completion of the mixing cycle being imminent. Preferably, the display means is responsive to the first warning signal for displaying a visually perceptible signal indicative of the completion of the mixing cycle being imminent.

Advantageously, an alerting means is provided for producing at least one of a visually perceptible signal and an aurally perceptible signal, the alerting means being responsive to the second signals for producing at least one of the visually and aurally perceptible signals to indicate the instants at which the respective ingredients are to be loaded into the mixer/feeder apparatus.

In one embodiment of the invention the alerting means is responsive to the mixing cycle complete signal produced by the signal processing means for producing at least one of the visually and aurally perceptible signals to indicate the completion of the mixing cycle.

In another embodiment of the invention the alerting means is responsive to the first warning signal produced by the signal processing means for producing at least one of the visually and aurally perceptible signals for indicating that the completion of the mixing cycle is imminent.

In one embodiment of the invention the alerting means comprises a siren. In another embodiment of the invention the alerting means comprises a light. In a still further embodiment of the invention the alerting means comprises a strobe light.

In another embodiment of the invention the signal processing means is responsive to the signals indicative of the operation of the mixer/feeder apparatus for producing an amount outstanding signal indicative of the amount of the ingredient currently being loaded into the mixer/feeder apparatus still to be loaded therein. Preferably, the signal processing means is responsive to a signal of the signals indicative of the operation of the mixer/feeder apparatus which is indicative of the current weight of the ingredient currently being loaded into the mixer/feeder apparatus currently in the mixer/feeder apparatus for producing the amount outstanding signal. Advantageously, the display means is responsive to the amount outstanding signals for displaying the outstanding weight still to be loaded of the ingredient currently being loaded into the mixer/feeder apparatus in a countdown manner.

In another embodiment of the invention the signal processing means is responsive to the signals indicative of the operation of the mixer/feeder apparatus for producing an ingredient complete signal which is indicative of the current weight of the ingredient currently being loaded into the mixer/feeder apparatus in the mixer/feeder apparatus being equal to the weight of that ingredient to be loaded into the mixer/feeder apparatus. Preferably, the display means is responsive to the ingredient complete signal for producing a visually perceptible signal indicative of the current weight of the ingredient currently being loaded into the mixer/feeder apparatus in the mixer/feeder apparatus being equal to the weight of that ingredient to be loaded into the mixer/feeder apparatus. Advantageously, the alerting means is responsive to the ingredient complete signals produced by the signal processing means for producing at least one of the visually perceptible signal and aurally perceptible signal to indicate that the current weight of the ingredient currently being loaded into the mixer/feeder apparatus in the mixer/feeder apparatus is equal to the weight of that ingredient to be loaded into the mixer/feeder apparatus.

In another embodiment of the invention the signal processing means is responsive to the signals indicative of the operation of the mixer/feeder apparatus for producing a second warning signal indicative of the amount of the ingredient currently being loaded into the mixer/feeder apparatus approaching the amount of that ingredient to be loaded into the mixer/feeder apparatus. Preferably, the display means is responsive to the second warning signal for producing a visually perceptible signal indicative of the amount of the ingredient currently being loaded into the mixer/feeder apparatus approaching the amount of that ingredient to be loaded into the mixer/feeder apparatus. Advantageously, the alerting means is responsive to the first warning signals for producing at least one of the visually and aurally perceptible signals for indicating that the amount of the ingredient currently being loaded into the mixer/feeder apparatus is approaching the amount of that ingredient to be loaded into the mixer/feeder apparatus.

In one embodiment of the invention the display means comprises a visual display screen. In another embodiment of the invention the signal processing means comprises a microprocessor. Preferably, the signal processing means is programmable.

Advantageously, a first input means is provided for inputting into the first storing means the data indicative of the identity of the ingredients of the animal feed, the proportions of the respective ingredients required to produce the batch of animal feed, the instants during the mixing cycle at which the respective ingredients are to be loaded into the mixer/feeder apparatus and the duration of the mixing cycle. Preferably, the first input means comprises a first electronic interface for facilitating uploading of the data in electronic form into the first storing means.

Advantageously, a second input means is provided for inputting into the signal processing means data indicative of the number of animals for which the batch of animal feed is to be prepared. Preferably, the signal processing means is responsive to the stored data stored in the first storing means and the data indicative of the number of animals for which the batch of animal feed is to be prepared for computing the weight of each ingredient to be loaded into the mixer/feeder apparatus to produce the batch of animal feed. Ideally, the second input means comprises a keypad.

Preferably, the signal processing means is adapted for receiving the signals indicative of the operation of the mixer/feeder apparatus. Advantageously, the signal processing means is adapted for receiving signals from a monitoring means located on the mixer/feeder apparatus for monitoring the mixing function of the mixer/feeder apparatus. Ideally, the signal processing means is adapted for receiving signals from the monitoring means located on the mixer/feeder apparatus indicative of the rotation of a mixing rotor of the mixer/feeder apparatus. Preferably, the signal processing means is adapted for receiving signals from a proximity sensor of the monitoring means, the signals from the proximity sensor being indicative of a count of the revolutions of the mixing rotor of the mixer/feeder apparatus.

Advantageously, the signal processing means is adapted for receiving signals from a weighing means of the mixer/feeder apparatus for weighing the ingredients in a mixing compartment thereof. Preferably, the signal processing means is adapted for receiving signals from a load cell of the weighing means indicative of the weight of the ingredients in the mixing compartment of the mixer/feeder apparatus.

In one embodiment of the invention the instants during the mixing cycle at which the respective ingredients are to be loaded into the mixer/feeder apparatus are selected so that the duration of the mixing cycle remaining after the corresponding selected instant for each ingredient is substantially equal to the duration of mixing to which that ingredient is to be subjected.

Preferably, the instant during the mixing cycle at which each ingredient is to be loaded into the mixer/feeder apparatus is selected so that the number of revolutions of a mixing means of the mixer/feeder apparatus remaining in the mixing cycle from the selected instant for that ingredient is substantially equal to the number of revolutions of the mixing means to which that ingredient is to be subjected during the mixing cycle.

In one embodiment of the invention a second storing means is provided for storing data indicative of the ingredients and the respective actual weights thereof in a batch of animal feed prepared in the mixer/feeder apparatus, and for storing the actual instants during the mixing cycle at which the respective ingredients were loaded into the mixer/feeder apparatus, and the actual duration of the mixing cycle.

Advantageously, the signal processing means is responsive to the signals indicative of the operation of the mixer/feeder apparatus for determining the actual weights of the respective ingredients in the batch of animal feed prepared in the mixer/feeder apparatus and for determining the instants during the mixing cycle at which the respective ingredients were loaded into the mixer/feeder apparatus, and for determining the actual duration of the mixing cycle, and the signal processing means is adapted for storing the determined actual weights of the ingredients, the actual instants during the mixing cycle at which the respective ingredients were loaded into the mixer/feeder apparatus and the actual duration of the mixing cycle in the second storing means.

Preferably, the first interface means is adapted for facilitating downloading of the data stored in the second storing means for facilitation subsequent comparison of the data with ideal data.

The invention also provides a mixer/feeder apparatus comprising a housing defining a mixing compartment supported on a weighing means for weighing material in the mixing compartment, the weighing means being adapted for outputting a signal indicative of the weight of material in the mixing compartment, a mixing rotor rotatably mounted in the mixing compartment, a monitoring means for counting the number of revolutions of the mixing rotor, the monitoring means being adapted for outputting a signal indicative of a count of the number of revolutions of the mixing rotor, and a device according to the invention, the signal processing means of the device being responsive to the signal from the monitoring means for producing the second signals to identify the instants at which the respective ingredients are to be loaded into the mixing compartment during the mixing cycle.

Preferably, the signal processing means is responsive to the signal from the monitoring means for producing the mixing cycle complete signal.

Advantageously, the signal processing means is responsive to the signal from the monitoring means for producing the first warning signal.

Ideally, the signal processing means is responsive to the signal from the monitoring means for producing the duration countdown signal.

Preferably, the signal processing means is responsive to the signal from the weighing means for producing the amount outstanding signal.

Advantageously, the signal processing means is responsive to the signal from the weighing means for determining the actual weight of each ingredient loaded into the mixing compartment during the mixing cycle.

Preferably, the signal processing means is responsive to the signals from the weighing means for producing the second warning signal.

Advantageously, the signal processing means is responsive to the signal from the monitoring means for determining the actual instants during the mixing cycle at which the respective ingredients were loaded into the mixing compartment.

Preferably, the signal processing means is responsive to the signal from the monitoring means for determining the actual number of revolutions of the mixing rotor to which the animal feed was subjected during the mixing cycle.

In one embodiment of the invention a chassis is provided, and the weighing means are located on the chassis with the housing supported on the weighing means. Preferably, the weighing means comprises at least one load cell. Advantageously, four load cells are provided, mounted at respective corners of the housing.

In one embodiment of the invention the housing defines an upwardly facing open mouth to the mixing compartment. Preferably, a discharge means is provided for discharging the batch of animal feed from the mixing compartment. Advantageously, the housing defines a dispensing chamber communicating with the mixing compartment through a communicating opening, and the discharge means comprises a dispensing auger located in the dispensing chamber for urging mixed animal feed from the dispensing chamber through a discharge outlet.

In another embodiment of the invention an isolating means is provided for selectively isolating the dispensing compartment from the mixing compartment during mixing of the animal feed therein.

Preferably, the mixing rotor is rotatable around a primary rotational axis, and the dispensing auger is rotatable about a secondary rotational axis, the primary and secondary axes extending parallel to each other.

In one embodiment of the invention the mixer/feeder apparatus is adapted for being trailed by a towing vehicle.

The advantages of the invention are many. In particular, the device according to the invention prevent over-mixing and under-mixing of the batch of animal feed, and in particular, over-mixing and under-mixing of the respective ingredients of the batch of animal feed is avoided. By virtue of the fact that the device determines the instants at which the respective ingredients are to be loaded into the mixer/feeder apparatus during the mixing cycle, each of the ingredients are subjected to the appropriate amount of mixing. By virtue of the fact that the instants at which the respective ingredients are to be loaded into the mixer/feeder apparatus are determined as a function of the count of revolutions of the mixing rotor from the commencement of the mixing cycle, and furthermore, by virtue of the fact that the counts of the revolutions of the mixing rotor at which the respective ingredients are to be loaded into the mixer/feeder wagon from the commencement of the mixing cycle are such that the remaining number of revolutions of the mixing rotor remaining in the mixing cycle is equal to the desired number of revolutions of the mixing rotor to which the respective ingredients are to be subjected, over-mixing and under-mixing of the ingredients of the batch of animal feed, and in turn the batch of animal feed is avoided.

Figure 2:
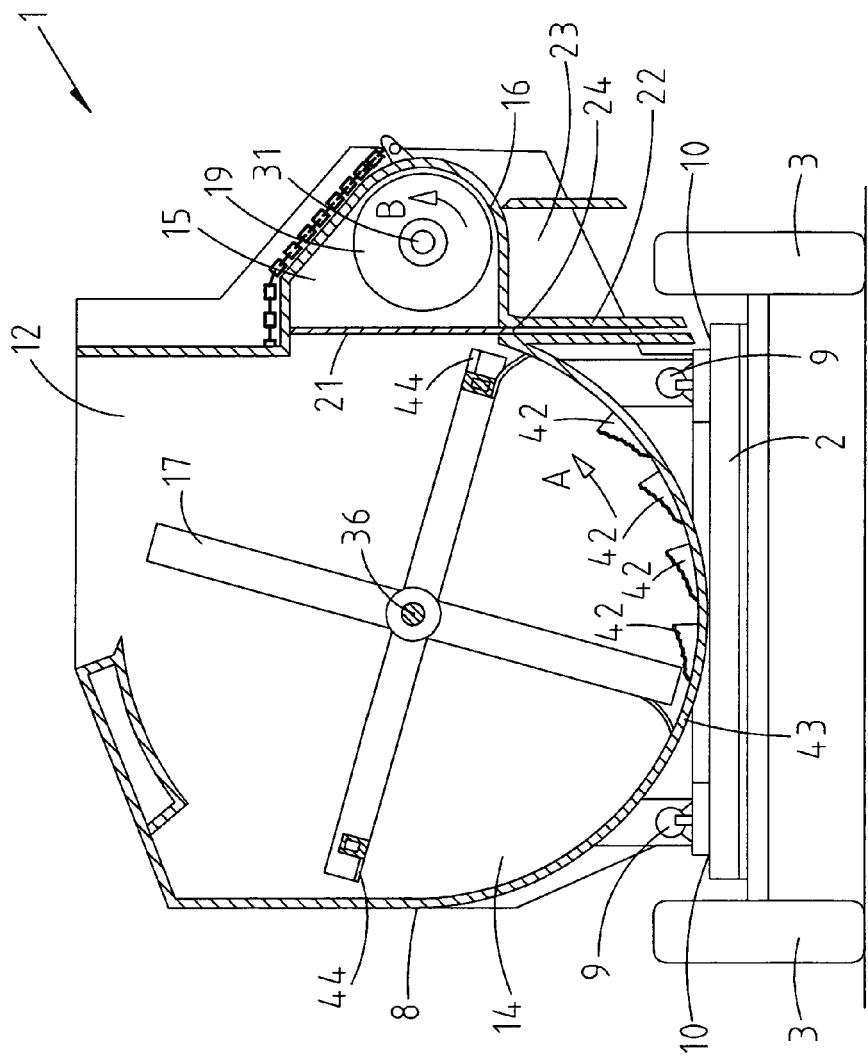
Figure 3:
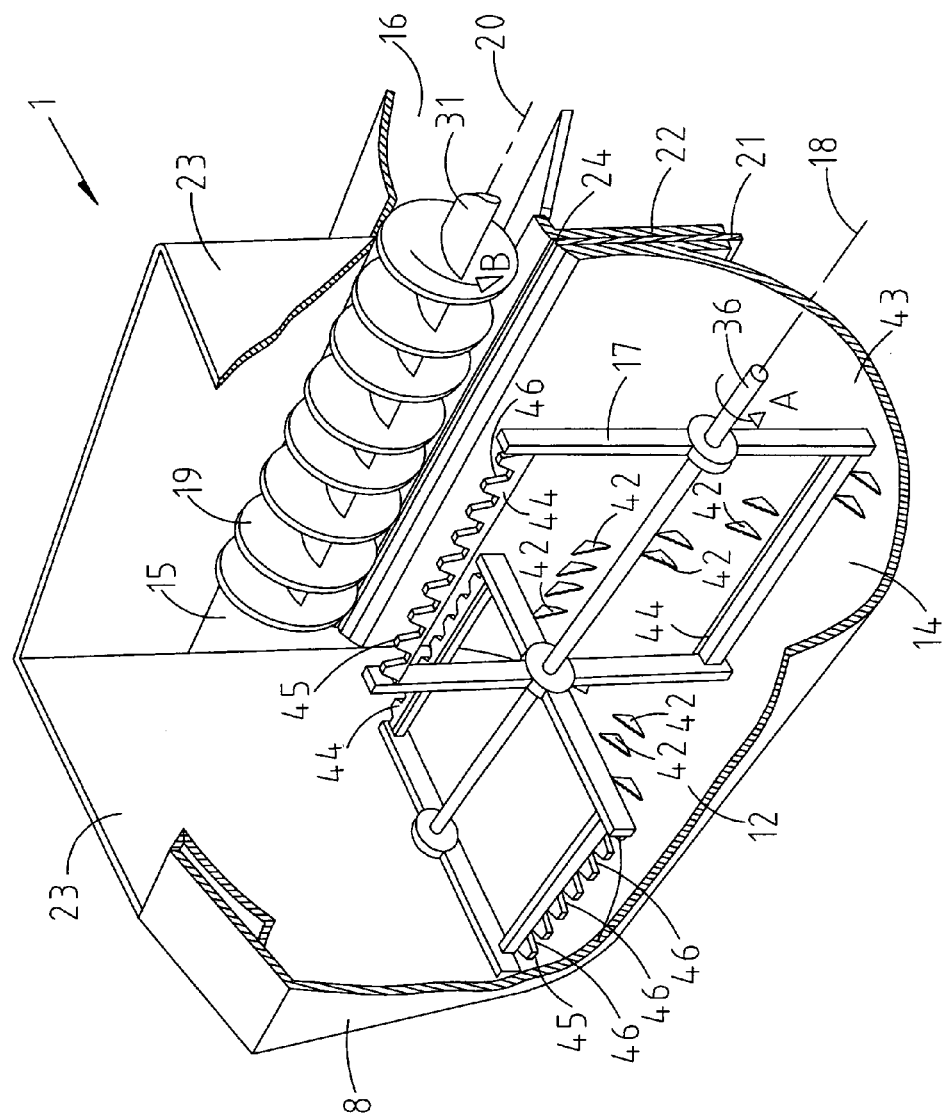
Figure 4:
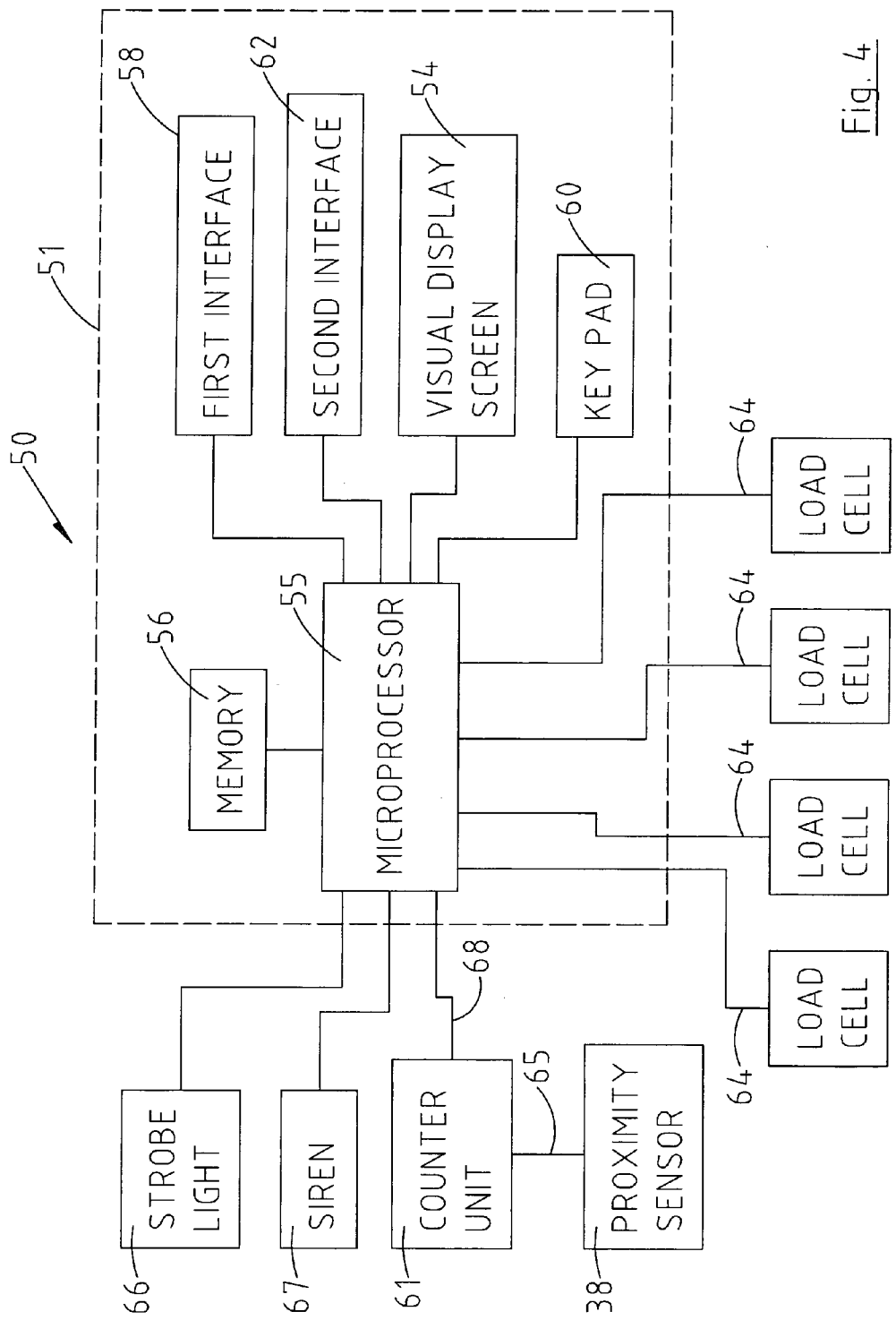

The invention will be more clearly understood from the following description of a preferred embodiment thereof, which is given by way of example only, with reference to the accompanying drawings, in which:

FIG. 1 is a perspective view of a mixer/feeder wagon according to the invention, FIG. 2 is a transverse cross-sectional end elevational view of the mixer/feeder wagon of FIG. 1, FIG. 3 is a perspective view of the mixer/feeder wagon of FIG. 1, and FIG. 4 is a block representation of a device also according to the invention for monitoring the operation of the mixer/feeder wagon of FIG. 1.

Referring to the drawings, there is illustrated a mixer/feeder apparatus according to the invention, provided by a mixer/feeder wagon, indicated generally by the reference numeral 1. The mixer/feeder wagon 1 is particularly suitable for mixing ingredients to produce batches of animal feed for dry cows, milking cows, calves, heifers, beef cattle and the like, and is of the general type disclosed in PCT published Application Specification No. WO 96/32836 of the present applicant. The to mixer/feeder wagon 1 comprises a chassis 2 which is carried on a pair of rotably mounted ground engaging wheels 3. A tow hitch 6 is provided at a forward end of the chassis 2 for hitching the mixer/feeder wagon 1 to a tractor or other suitable towing vehicle. A housing 8 is carried on the chassis 2 and is supported on weighing means comprising four load cells 9 at corresponding corners 10 of the chassis 2 for facilitating weighing of the ingredients of the animal feed in the housing 8 as will be described below.

The housing 8 is of steel plate material and defines a hollow interior region 12 which forms a mixing compartment 14 within which the animal feed is mixed, and a dispensing compartment 15 through which mixed animal feed is dispensed from the mixing compartment 14 through a discharge outlet 16. A mixing rotor, in this embodiment of the invention a paddle mixer 17 is rotatably mounted in the mixing compartment 14, and is rotatable about a primary rotational axis 18 in the direction of the arrow A for mixing the animal feed in the mixing compartment 14. A discharge means, namely, a discharge auger 19 rotatably mounted in the dispensing compartment 15 is rotatable about a secondary rotational axis 20 in the direction of the arrow B for urging mixed animal feed along the dispensing compartment 15 and through the discharge outlet 16. The primary and secondary rotational axes 18 and 20 extend parallel to each other.

A closure plate 21 of steel plate material selectively isolates the dispensing compartment 15 from the mixing compartment 14 during mixing of animal feed in the mixing compartment 14. The closure plate 21 is slideably mounted in guide tracks 22 which are carried on opposite end walls 23 of the housing 8, and is accommodated through a longitudinally extending slot 24 extending through the housing 8 between the mixing compartment 14 and the dispensing compartment 15 from a lower open state illustrated in FIG. 3 for communicating the dispensing compartment with the mixing compartment, and a raised closed state illustrated in FIG. 2 for isolating the dispensing compartment 15 from the mixing compartment 14 during mixing of the animal feed in the mixing compartment 14. An hydraulic ram (not shown) is provided for urging the closure plate 21 between the lower open state and the raised closed state.

A drive transmission indicated generally by the reference numeral 25 located at the forward end of the housing 8 transmits drive from a gearbox 26 mounted on the chassis 2 to the paddle mixer 17 and the discharge auger 19. An input shaft 27 to the gearbox 26 is provided for coupling via a drive shaft (not shown) to the power takeoff shaft of a tractor to which the mixer/feeder wagon 1 is hitched for providing drive to the gearbox 26, and in turn to the paddle mixer 17 and the discharge auger 19. A primary chain drive 29 from the gearbox 26 drives a first sprocket 30 which is fast on a shaft 31 of the discharge auger 19 for driving the discharge auger 19. A second sprocket 33 also fast on the shaft 31 drives a secondary chain drive 34 for in turn driving a third sprocket 35 which is fast on a shaft 36 of the paddle mixer 17 for in turn driving the paddle mixer 17. The drive transmission 25 is geared to give a gear ratio of approximately 54:1 between the drive from the power takeoff shaft of a tractor and the rotational speed of the paddle mixer 17. It has been found that the ideal rotational speed of the paddle mixer 17 is approximately 8.5 rpm.

A monitoring means, in this embodiment of the invention a proximity sensor 38 is mounted on a framework 39 of the mixer/feeder wagon 1 for detecting a steel bolt 40 on the third sprocket 35 for counting the number of revolutions of the third sprocket 35, which is equal to the number of revolutions of the paddle mixer 17.

A plurality of stationary chopping blades 42 rigidly mounted on a semicircular base 43 of the housing 8 extend upwardly from the base 43 into the mixing compartment 14 and co-operate with paddles 44 of the paddle mixer 17 for chopping fibrous material of relatively long length into shorter lengths. The chopping blades 42 are axially spaced apart along the base 43, and are arranged in circumferentially staggered pairs in order to minimise the load on the paddle mixer 17 as the paddles 44 co-operate with the chopping blades 42 for chopping the fibrous material. The paddles 44 of the paddle mixer 17 define substantially longitudinally extending peripheral edges 45 which describe a cylinder as the paddle mixer 17 rotates, the diameter of which is just less than the diameter of the semicircular base 43, by approximately 15 mm. A plurality of axially spaced apart recesses 46 formed into the paddles 44 from the peripheral edges 45 accommodate the chopping blades 42 therethrough as the paddle mixer 17 rotates. Thus as the paddle mixer 17 rotates, the paddles 44 urge the fibrous material against the chopping blades 42 for chopping thereof. It has been found that by subjecting the fibrous material, depending on its average length, to an appropriate number of revolutions of the paddle mixer 17, the fibrous material can be reduced to lengths in the range of 50 mm to 100 mm.

Accordingly, the mixer/feeder wagon 1 according to this embodiment of the invention, as well as mixing the ingredients of the batch of animal feed, simultaneously chops the fibrous material, so that the fibrous material of the mixed batch of animal feed is of length in the range of 50 mm to 100 mm.

With the exception of the operation of the closure plate 21 and the provision of the proximity sensor 38 and the steel bolt 40 on the third sprocket 35, the mixer/feeder wagon 1 up to this point is substantially similar to that disclosed in PCT published Application Specification No. WO 96/32836, and operation of the mixer/feeder wagon 1 for mixing and dispensing animal feed is also substantially similar to the operation of the mixer/feeder wagon disclosed in PCT published Application Specification No. WO 96/32836, and further description of the mixer/feeder wagon and its operation in the mixing and dispensing of animal feed should not be required.

The mixer/feeder wagon 1 comprises a device also according to the invention and indicated generally by the reference numeral 50 for monitoring operation of the mixer/feeder wagon 1 and for determining the instants during a mixing cycle of a batch of animal feed at which respective ingredients of the animal feed are to be loaded into the mixer/feeder wagon 1. The device 50 in response to monitoring the operation of the mixer/feeder wagon 1 presents data to an operator of the mixer/feeder wagon 1 indicative of a mixing regime of a mixing cycle for mixing a batch of animal feed from a predefined set of ingredients together with the weights of the respective ingredients and the sequence in which the ingredients are to be loaded into the mixer/feeder wagon 1.

The device 50 comprises a housing 51, and is mounted to the housing 8 of the mixer/feeder wagon 1 by a swivelable bracket 52. A visual display screen 54 located in the housing 51 displays data to an operator of the mixer/feeder wagon 1 which includes a display of the ingredients sequentially of the batch of animal feed to be mixed, the weight of each ingredient to make up the batch of animal feed, the instants during the mixing cycle at which the respective ingredients are to be loaded into the mixing compartment 14 of the mixer/feeder wagon 1 in order to avoid under-mixing and over-mixing of the respective ingredients, as will be described in more detail below.

Referring in particular to FIG. 4, a signal processing means, in this embodiment of the invention provided by a microprocessor 55, is located within the housing 51 for controlling the operation of the device 50. A first storing means, in this embodiment of the invention provided by a suitable memory, typically a random access memory (RAM) 56, stores data relating to the ingredients of the animal feed, the proportions of the ingredients to make up the animal feed and the mixing regime to which the ingredients of the batch of animal feed are to be subjected during a mixing cycle in the mixing compartment 14. The data stored in the RAM 56 comprises the identity of the ingredients of the batch of animal feed, the proportion of each ingredient to be mixed to form the batch of animal feed, the instants during the mixing cycle at which the respective ingredients are to be loaded into the mixing compartment 14 during the mixing cycle, and the total number of revolutions of the paddle mixer 17 for the mixing cycle. The proportions of the respective ingredients are stored in the RAM 56 by the weights of the ingredients required to prepare an animal feed ration for a single animal.

In this embodiment of the invention the instants at which the ingredients are to be loaded into the mixing compartment 14 during a mixing cycle are defined by the number of revolutions of the paddle mixer 17 from commencement of the mixing cycle. The instants at which the respective ingredients are to be loaded into the mixing compartment 14 are predefined and are selected, so that the remaining number of revolutions of the paddle mixer 17 in the mixing cycle at the instant at which each ingredient is to be loaded into the mixing compartment is equal to the desired number of revolutions to which that ingredient is to be subjected during the mixing cycle. In other words, if a mixing cycle were to be of duration of eighty revolutions of the paddle mixer 17, and if one of the ingredients were to be subjected to thirty-five revolutions of the paddle mixer 17, the instant at which that ingredient should be loaded into the mixing compartment 14 during the mixing cycle would be at revolution no. 45 from the commencement of the mixing cycle. Thus, by loading the ingredients into the mixing compartment 14 at the defined instants in the mixing cycle, each ingredient is subjected to the appropriate number of revolutions of the paddle mixer 17 during the mixing cycle, thereby avoiding both over-mixing and under-mixing of the respective ingredients, and in turn avoiding both over-mixing and under-mixing of the batch of animal feed.

A first input means comprising a first interface 58, which may be a parallel or serial interface, includes a first input port 59 in the housing 51 for uploading the data relating to the ingredients of the animal feed and the mixing regime through the microprocessor 55 into the RAM 56. In this embodiment of the invention the first input port 59 is a USB port. A second input means comprising a keypad 60 in the housing 51 facilitates manual inputting of data into the microprocessor 55 and for programming the microprocessor 55. Programming of the microprocessor 55 can also be carried out through the first interface 58. In this embodiment of the invention the number of animals to be fed by the batch of animal feed is inputted to the microprocessor 55 by an operator of the mixer/feeder wagon through the keypad 60. The microprocessor 55 is programmed to compute the total weight of each ingredient from the data stored in the RAM 56 and the inputted number of animals for which the batch of animal feed is to be prepared.

A second interface means comprising a second interface 62 which includes a second input port 63 in the housing 51 is provided through which signals from the load cells 9, which are indicative of the weight of the ingredients currently in the mixing compartment 14 are inputted to the microprocessor 55, and through which signals from the proximity sensor 38, which are indicative of a count of the number of revolutions of the paddle mixer 17, are inputted to the microprocessor 55. A cable 64 from the load cells 9 couples the load cells 9 to the second input port 63. In this embodiment of the invention signals from the proximity sensor 38 are applied to an electronic counter unit 61 which is located on the framework 39 through a cable 65. The counter unit 61 continuously and cumulatively counts the revolutions of the third sprocket 35, and in turn the revolutions of the paddle mixer 17. The cumulative count of the revolutions of the paddle mixer 17 is read by the microprocessor 55 from the electronic count unit 61 through the second interface 62 and the second input port 63 through a cable 68 which couples the electronic counter unit 61 to the second input port 63 of the device 50.

An alerting means, in this embodiment of the invention provided by a siren 67 which is mounted on the housing 8 of the mixer/feeder wagon 1 is operated under the control of the microprocessor 55 of the device 50 for indicating the instants during the mixing cycle at which the respective ingredients are to be loaded into the mixing compartment 14, as well as for indicating when the appropriate weights of the respective ingredients have been loaded into the mixing compartment 14, and for indicating when the mixing cycle has been completed. The siren 67 is also operated under the control of the microprocessor 55 for indicating when the end of the mixing cycle is imminent, and when only a predefined amount of each ingredient still remains to be loaded into the mixing compartment 14. The siren 67 is operated by a pulsed signal outputted by the microprocessor 55 when the end of the mixing cycle is approaching, as well as when only the predefined amount of each ingredient still remains to be loaded into the mixing compartment 14. The frequency of the pulsed signal progressively increases as the end of the mixing cycle is approaching, until the end of the mixing cycle has been reached. At which stage the siren 67 is continuously operated by a continuous signal outputted by the microprocessor 55 for a period of five seconds. In this embodiment of the invention the siren 67 is operated by the pulsed signal when only two revolutions of the paddle mixer 17 remain to complete the mixing cycle. Similarly, as the weight of each ingredient being loaded into the mixing compartment approaches the total weight required of that ingredient, the frequency of the pulsed signal from the microprocessor 55 to the siren 67 increases until the loading of that ingredient has been completed, at which stage the pulsed signal becomes a continuous signal for a period of five seconds to operate the siren 67 continuously for five seconds indicting that loading of that ingredient has been completed. In this embodiment of the invention the pulsed signal is outputted when the outstanding amount of each ingredient still to be loaded into the mixing compartment reaches the predefined level, which in this case is approximately 15% of the total weight of that ingredient.

The microprocessor 55 is programmed so that after the device 50 has been activated, the microprocessor 55 outputs a signal to the visual display screen 54 to display a message requesting inputting of the number of animals for which the batch of animal feed is to be prepared. On the number of animals being inputted through the keypad 60, the microprocessor 55 is programmed to look up the data relating to the ingredients of the animal feed stored in the RAM 56, and to compute the total weight of each ingredient required to prepare the batch of animal feed based on the inputted number of animals. The microprocessor 55 is programmed also to look up the total number of revolutions of the paddle mixer 17 which constitutes the duration of the mixing cycle stored in the RAM 56, as well as the counts of the revolutions of the paddle mixer 17 from the commencement of the mixing cycle at which the respective ingredients are to be loaded into the mixing compartment 14. With this data computed and obtained, the microprocessor 55 is programmed to then output a first one of a plurality of first signals to the visual display screen 54 which is indicative of the identity of the first of the ingredients to be loaded into the mixing compartment 14, together with the total weight of that ingredient to be loaded into the mixing compartment 14. The identity of the first ingredient to be loaded into the mixing compartment 14 and the total weight thereof are simultaneously displayed on the visual display screen 54.

The microprocessor 55 is programmed to read signals from the load cells 9 and to compute the weight of each ingredient currently in the mixing compartment 14 from the signals from the load cell 9. The microprocessor 55 is also programmed to read signals from the electronic counter unit 61 and to compute the number of revolutions of the paddle mixer 17 to which the ingredients have been subjected from the commencement of a mixing cycle. Additionally, as the respective ingredients are being loaded into the mixing compartment 14, the microprocessor 55 is programmed to compute the outstanding weight of the ingredient which is currently being loaded into the mixing compartment 14 and which still has to be loaded into the mixing compartment 14. The microprocessor 55 outputs an amount outstanding signal to the visual display screen 54, which is continuously updated, and which operates the visual display screen 54 to display the outstanding weight of the ingredient which is currently being loaded into the mixing compartment 14, and which still has to be loaded, in a countdown manner. In other words, the outstanding weight of each ingredient still to be loaded into the mixing compartment 14 as that ingredient is being loaded is counted down on the visual display screen 54.

The microprocessor 55 is programmed so that on the completion of loading of the first and subsequent ingredients up to and including the second last ingredient to be loaded, the microprocessor 55 from the signals read from the electronic counter unit 61 identifies the count of revolutions of the paddle mixer 17 from the commencement of the mixing cycle at which the next ingredient is to be loaded, and outputs a second signal to the visual display screen 54 and to the siren 67, which causes the visual display screen 54 to flash and the siren 67 to continuously sound in order to indicate that loading of the next ingredient into the mixing compartment 14 is to commence. The siren is continuously operated for five seconds, and the display screen 54 is operated to flash for five seconds.

After the last of the ingredients has been loaded into the mixing compartment, the microprocessor 55 is programmed to output a countdown signal to the visual display screen 54, which is continuously updated for operating the visual display screen 54 to count down the number of revolutions of the paddle mixer 17 to the end of the mixing cycle. When the number of counts of the paddle mixer 17 remaining to the end of the mixing cycle is two revolutions, the microprocessor 55 is programmed to output a first warning signal which is provided by the pulsed signal to the siren 67, the frequency of which increases until the mixing cycle has been completed. At which stage the microprocessor 55 outputs a mixing cycle complete signal, which is a continuous signal to the siren 67 for five seconds, thereby causing the siren 67 to continuously operate for five seconds.

The microprocessor 55 is programmed so that when the loading of each ingredient has been completed, the microprocessor 55 outputs a countdown signal to the visual display screen 54 which is continuously updated and which displays the outstanding number of revolutions of the paddle mixer 17 to the count at which the next ingredient is to be loaded into the mixing compartment 14.

When the amount of each ingredient still to be loaded into the mixing compartment reaches the predefined amount, which as discussed above is approximately 15% of the total weight of that ingredient, the microprocessor 55 is programmed to output a second warning signal to the visual display screen 54 which causes the visual display screen 54 to flash, in order to warn the operator that the loading of that particular ingredient is almost completed. The microprocessor 55 also outputs a second warning signal to the siren 67, which is one of the pulsed signal, the frequency of which increases as completion of the loading of that ingredient approaches until the weight of that ingredient loaded into the mixing compartment is substantially equal to the required weight of that ingredient. At which stage, as discussed above, the signal to the siren becomes continuous and is held on the siren 67 for five seconds, thus indicating that the loading of that ingredient is complete.

The microprocessor 55 is programmed to identify the commencement of the mixing cycle from signals read from the load cells 9. Once the signals from the load cells 9 are indicative of the first ingredient being loaded into the mixing compartment 14, the microprocessor 55 determines the commencement of the mixing cycle and commences to count the number of revolutions of the paddle mixer 17 from the signals read from the electronic counter unit 61. The microprocessor 55 is similarly programmed to identify the commencement of loading of each of the other ingredients in a similar manner.

Additionally, on completion of the loading of each ingredient into the mixing compartment 14, the microprocessor 55 is programmed to output the next first signal to the visual display screen 54, which operates the visual display screen to display the identity of the next ingredient and the total weight thereof to be loaded into the mixing compartment 14.

A strobe light 66 is also mounted on the housing 8 of the mixer/feeder wagon 1 and is operated under the control of the microprocessor 55 of the device 50 for indicating when loading of each ingredient has been completed, and when the mixing cycle has been completed. The strobe light 66 is powered under the control of the microprocessor 55 for a period of five seconds when the loading of each ingredient has been completed, and at the end of the mixing cycle. However, it is envisaged in many cases, the strobe light may be omitted.

A second storing means for storing the actual weights of the respective ingredients loaded into the mixing compartment 14, and the actual mixing regime carried out by the operator in preparing the batch of animal feed, in this embodiment of the invention is also provided by the RAM 56. However, if desired, a separate storing means as well as the RAM 56 may be provided to store this data. The microprocessor 55 is programmed to compute the actual weight of each ingredient loaded into the mixing compartment 14 from signals read from the load cells 9. Additionally, the microprocessor 55 is programmed to determine the instants during the mixing cycle based on the count of revolutions of the paddle mixer 17 at which loading of the respective ingredients in the mixing compartment 14 commenced. The microprocessor 55 determines the count of the revolutions of the paddle mixer 17 from the commencement of the mixing cycle at which loading of each ingredient into the mixing compartment 14 commenced from signals from the load cells 9 and the electronic counter unit 61. The microprocessor 55 is also programmed to store the actual weights of the respective ingredients and the corresponding counts of the revolutions of the paddle mixer 17 from the commencement of the mixing cycle at which loading of the respective ingredients into the mixing compartment 14 commenced in the RAM 56. At appropriate intervals this data may be downloaded through the first interface 58 under the control of the microprocessor 55 for subsequent comparison with the ideal mixing regime and also for comparison with results of, for example, milk yield for milking cows or weight gain from beef cattle fed by the batch of animal feed against ideal milk yields or ideal weight gains, as the case may be, which would be obtained from an ideal batch of animal feed.

In use, initially the ingredients, their proportions and the mixing regime to produce a ration of animal feed for one animal is prepared by a nutritionist or by an appropriately programmed computer based on prior analysis of the ingredients available to the operator of the mixer/feeder wagon 1, the type of animals to be fed and the type of mixer/feeder wagon. Such analysis would include an analysis of the nutritional and energy values of the respective ingredients, and in the case of fibrous material would include an analysis of the structure of the fibrous material, the average lengths of the fibrous material, and if the ingredients included a number of fibrous ingredients, the structure of each of the fibrous ingredients and the average fibre lengths thereof. On completion of the analysis, a feed ration for a single animal is prepared based on the weights of the respective ingredients required to produce the feed ration for a single animal. Additionally, depending on the structures and the average lengths of the fibres of the respective fibrous ingredients, and the structure and other parameters of the non-fibrous ingredients, the type of the animals and the type of the mixer/feeder wagon, the number of revolutions of the paddle mixer 17 to which each of the ingredients should be subjected in the mixing compartment of the mixer/feeder wagon and the total number of revolutions of the mixing cycle are also determined by the nutritionist or by an appropriately programmed computer. With the weights of the respective ingredients to produce a single animal feed ration and the numbers of revolutions of the paddle mixer 17 to which the respective ingredients are to be subjected, a mixing regime for the animal feed is prepared by the nutritionist.

The number of revolutions of the paddle mixer 17 to which each ingredient is to be subjected in the mixing compartment 14 is determined to avoid over-mixing and under-mixing of the respective ingredients and in turn of the batch of animal feed, while at the same time producing a homogenously mixed batch of animal feed. In general, since the fibrous ingredients will require chopping in the mixing compartment 14 of the mixer/feeder wagon 1, the fibrous ingredients will require the maximum mixing period in the mixing compartment 14. The loading of each of the ingredients into the mixing compartment 14 takes some time, and when determining the mixing periods during which the respective ingredients are to be subjected to mixing in the mixing compartment, account is taken of this. This, in turn, is taken into account when determining the counts of the revolutions of the paddle mixer 17 from the commencement of the mixing cycle at which the respective ingredients are to be loaded into the mixing compartment.

The instants during the mixing cycle based on the count of revolutions of the paddle mixer 17 from the commencement of the mixing cycle at which the respective ingredients are to be loaded into the mixing compartment 14 are computed, so that the respective ingredients are loaded into the mixing compartment 14 at the appropriate count of revolutions of the paddle mixer 17. As discussed above, the count of the revolutions of the paddle mixer 17 at which each ingredient is to be loaded into the mixing compartment 14 is selected so that the number of revolutions of the paddle mixer 17 remaining in the mixing cycle is equal to the number of revolutions of the paddle mixer 17 to which that ingredient is to be subjected in the mixing compartment 14.

The identity of the ingredients and the weight of each ingredient required to produce a single animal feed ration together with the mixing regime including the number of revolutions of the paddle mixer 17 which constitutes the duration of the mixing cycle, and the counts of the revolutions of the paddle mixer 17 during the mixing cycle from the commencement thereof at which the respective ingredients are to be loaded into the mixing compartment 14 is uploaded into the RAM 56 through the first interface 58 and the first input port 59 under the control of the microprocessor 55. With the identity of the ingredients, the weights thereof for a single animal feed ration and the mixing regime including the number of revolutions of the paddle mixer 17 which constitutes the duration of the mixing cycle and the counts of the revolutions of the paddle mixer 17 during the mixing cycle from the commencement thereof at which the respective ingredients are to be loaded into the mixing compartment 14 stored in the RAM 56, the mixer/feeder wagon 1 and the device 50 are ready for use.

When it is desired to mix a batch of animal feed based on the stored ingredients and the mixing regime, the mixer/feeder wagon 1 is operated with the closure plate 21 in the raised closed state and the paddle mixer 17 rotating. The operator activates the device 50, which displays a request on the visual display screen 54 requesting the number of animals to be fed with the batch of animal feed to be entered. The number of animals to be fed from the batch of animal feed is entered through the keypad 60. The microprocessor 55 computes the total weight of each ingredient required to prepare the batch of animal feed based on the entered number of animals. The first ingredient which is to be loaded into the mixing compartment 14 and the weight of that ingredient are simultaneously displayed on the visual display screen 54 under the control of the microprocessor 55. The microprocessor 55 reads signals from the load cells 9 to determine when loading of the first ingredient has commenced. Alternatively, the microprocessor 55 may be programmed to enable the operator to indicate that he is ready to commence loading of the first ingredient by depressing an appropriate one of the keys of the keypad 60, thus indicating to the microprocessor 55 that loading of the first of the ingredients is about to commence. On determining that loading of the first ingredient has commenced either as a result of the signals from the load cells 9 or an input through the keypad 60, the microprocessor 55 reads the signals from the electronic counter unit 61, and commences the count of revolutions of the paddle mixer 17 from the commencement of the mixing cycle.

The microprocessor 55 reads the signals from the load cells 9 and computes the weight of the first ingredient currently loaded into the mixing compartment 14, and subtracts this value from the total weight of the first ingredient to be loaded into the mixing compartment 14 in order to determine the outstanding weight of the first ingredient still to be loaded into the mixing compartment. This value is displayed on the visual display screen 54, and is continuously updated, thus counting down the weight of the first ingredient still to be loaded into the mixing compartment 14.

When the loading of the first ingredient into the mixing compartment 14 is nearing completion, in other words, when only the predefined amount of the first ingredient still has to be loaded into the mixing compartment 14, the microprocessor 55 causes the visual display screen 54 to flash, and also outputs the second warning signal, which is the pulsed signal, to the siren 67. The pulsed signal progressively increases in frequency until the weight of the first ingredient in the mixing compartment 14 is substantially equal to the required weight of the first ingredient. At which stage the signal outputted by the microprocessor 55 to operate the siren 67 becomes a continuous signal, and is held on the siren for five seconds to indicate that loading of the first ingredient is complete. The continuous signal is also applied to and held on the strobe light 66 to operate the strobe light 66 continuously for five seconds to also indicate that loading of that ingredient is complete.

The microprocessor 55 then operates the visual display screen 54 to simultaneously display the identity of the second ingredient and the weight thereof to be loaded into the mixing compartment 14. The microprocessor 55 also determines the number of revolutions still to be completed before loading of the second ingredient into the mixing compartment 14 is to commence, and the microprocessor 55 operates the visual display screen 54 to count down the number of revolutions of the paddle mixer 17 to the count at which the second ingredient is to be loaded into the mixing compartment 14. When the count of the number of revolutions of the paddle mixer 17 from the commencement of the mixing cycle at which the second ingredient is to be loaded into the mixing compartment 14 has been reached, the microprocessor 55 outputs the second signal to the siren 67, which is a continuous signal for five seconds, thus indicating that loading of the second ingredient is to be commenced.

The operator then immediately commences loading in the second ingredient, and the microprocessor 55 reads the signals from the load cells 9 and computes the current weight of the second ingredient which has been loaded into the mixing compartment 14. This value is subtracted from the total value of the second ingredient to be loaded into the mixing compartment 14, in order to produce the outstanding weight of the second ingredient still to be loaded into the mixing compartment 14. The value of the outstanding weight of the second ingredient still to be loaded into the mixing compartment 14 is displayed on the visual display screen 54, which is continuously updated, and counted down. As loading of the second ingredient into the mixing compartment 14 is approaching completion, in other words, when the predefined amount of the second ingredient is still to be loaded into the mixing compartment 14, the microprocessor 55 operates the visual display screen 54 to flash, and outputs the second warning signal to the siren 67, which is the continuous signal for five seconds. The continuous signal is also applied to the strobe light 66 and is held on the strobe light 66 for the five-second period.

And so loading of the respective ingredients of the batch of animal feed into the mixing compartment 14 continues until the last of the ingredients of the batch to be loaded has been loaded into the mixing compartment 14. At which stage, the microprocessor 55 determines the remaining number of revolutions of the paddle mixer 17 to which the animal feed is to be subjected in the mixing compartment 14, and the number of revolutions of the paddle mixer 17 to complete the mixing cycle of the batch of animal feed is displayed on the visual display screen 54, and is continuously updated and counted down. As the end of the mixing cycle is approaching, in this case when the number of revolutions of the paddle mixer 17 remaining in the mixing cycle is two revolutions, the microprocessor 55 operates the display on the visual display screen 54 to flash and outputs the first warning signal, namely, the pulsed signal to the siren 67, the frequency of which progressively increases until the mixing cycle has been completed, at which stage the pulsed signal becomes a continuous signal for five seconds, thus indicating completion of the mixing cycle. The continuous signal is also applied to the strobe light 66, and is held on the strobe light 66 for five seconds.

If on completion of loading of any one of the ingredients, the next ingredient is to be immediately loaded, the microprocessor 55 immediately at the end of loading of the just loaded ingredient operates the visual display screen 54 to simultaneously display the identity of the next ingredient and the weight thereof to be loaded and flashes the visual display screen 54. The microprocessor also outputs a second continuous signal to the siren 67 to operate the siren continuously for five seconds.

The actual particulars and the actual mixing regime of each batch of animal feed mixed in the mixer/feeder wagon 1 is recorded and stored in the RAM 56, and time and date stamped for future comparison with an ideal batch of animal feed as discussed above. During the mixing cycle, the microprocessor 55 computes the actual weight of each ingredient loaded into the mixing compartment 4 from the signals from the load cells 9 and from the signals from the electronic counter unit 61. The microprocessor 55 is programmed to compute the weight of each ingredient loaded into the mixing compartment 14 by reading signals from the load cells 9 between the count of the revolutions of the paddle mixer at which that ingredient should have been loaded and the count at which the next ingredient is to be loaded. The microprocessor 55 stores the respective actual weights of the respective ingredients in the RAM 56. The respective weights are time and date stamped and cross-referenced with the particulars of the batch.

Additionally, the microprocessor 55 by monitoring the signals from the load cells 9 and the signals from the electronic counter unit 61 determines the counts of the revolutions of the paddle mixer 17 from the commencement of the mixing cycle at which loading of the respective ingredients into the mixing compartment 14 commenced, and this data is also stored and cross-referenced with the respective ingredients in the RAM 56 and is similarly time and date stamped and cross-referenced with the particulars of the batch. The total number of revolutions of the paddle mixer 17 to which the batch of animal feed was subjected during the mixing cycle, in other words, the total number of revolutions of the paddle mixer 17 from the commencement of the mixing cycle to the actual end of the mixing cycle is also recorded and stored in the RAM 56, and is time and date stamped and cross-referenced with the particulars of the batch.

As discussed above, the microprocessor 55 may be programmed to allow the operator to manually input a signal to indicate when loading of each ingredient is about to commence. Such a signal could be inputted through the keypad 60. This signal would be used for determining the commencement of loading of each ingredient, instead of determining the commencement of loading of each ingredient from signals from the load cells 9 and the electronic counter unit 61.

On completion of mixing of the batch of animal feed, the mixer/feeder wagon 1 is trailed to the location at which the animal feed is to be dispensed. On reaching the location at which the batch of animal feed is to be dispensed, the closure plate 21 is operated from the raised closed state to the lower open state, and as the paddle mixer 17 is rotated in the direction of the arrow A, the mixed animal feed is urged into the dispensing compartment 15 and in turn urged along the dispensing compartment 15 by the discharge auger 19 through the discharge outlet 16.

A typical example of a batch of animal feed to feed a herd of one hundred milking cows together with the mixing regime is as follows.

| Ingredient | Weight per animal Kgs | Total weight Kgs | Total number of revolutions | Revolution count from commencement of the mixing cycle at which the ingredient is to be loaded |
|---|---|---|---|---|
| Molasses | 1 | 100 | 106 | 0 |
| Straw | 0.7 | 70 | 96 | 10 |
| Minerals | 0.3 | 30 | 86 | 20 |
| Sodawheat | 4.9 | 490 | 76 | 30 |
| Concentrate | 5 | 500 | 66 | 40 |
| Silage $3^{rd}$ cut | 12 | 1200 | 56 | 50 |
| Silage $1^{st}$ cut | 17 | 1700 | 18 | 88 |

Column 1 of the above table includes particulars of the respective ingredients of the batch of animal feed. Column 2 shows the weight required of each ingredient per animal. Column 3 shows the total weight of each ingredient to produce the batch of animal feed to feed the herd of one hundred milking cows. Column 4 shows the number of revolutions of the paddle mixer 17 to which each ingredient is to be subjected in the mixing compartment 14. Column 5 shows the count of the revolutions of the paddle mixer 17 from the commencement of the mixing cycle at which each of the ingredients is to be loaded into the mixing compartment 14.

In Example 1 the duration of the mixing cycle is one hundred and six revolutions of the paddle mixer 17. The molasses, which is a liquid ingredient, is the first of the ingredients to be loaded into the mixing compartment 14 at the commencement of the mixing cycle. The molasses is loaded first in order to dampen down dust and to ensure that any ingredients, such as concentrates which may be in powder form are not lost. The next ingredient which is to be loaded into the mixing compartment 14 is the main fibrous ingredient, which in this case is straw, and is loaded into the mixing compartment 14 at the count of ten revolutions of the paddle mixer 17 from the commencement of the mixing cycle. The reason ten counts of revolutions of the paddle mixer 17 are allowed between the commencement of the mixing cycle and the commencement of loading of the straw is to allow time for the loading of the molasses. The loading of the molasses lasts for a duration of approximately ten revolutions of the paddle mixer 17. Therefore, as soon as loading of the molasses has been completed, the straw is immediately loaded into the mixing compartment at the count of ten revolutions of the paddle mixer from the commencement of the mixing cycle. In this example the straw requires to be subjected to ninety-six revolutions of the paddle mixer 17, and effectively is the ingredient which requires to be subjected to the maximum number of revolutions of the paddle mixer 17. However, since it is desirable to load a liquid ingredient first to dampen down dust and powder ingredients, the molasses is the first ingredient to be loaded into the mixing compartment. Accordingly, in this embodiment of the invention the duration of the mixing cycle which is based on the number of revolutions of the paddle mixer 17 to which the straw is to be subjected plus the loading time of the molasses, namely, ten revolutions of the paddle mixer 17, thus giving a total mixing cycle duration of one hundred and six revolutions of the paddle mixer 17. The remaining ingredients are loaded into the mixing compartment at the counts set forth in column 5 of the table of Example 1 so that they are each subjected to the appropriate number of revolutions during the mixing cycle to which they should be subjected in order to produce a homogenously mixed batch of animal feed, and to avoid under-mixing and over-mixing of the ingredients and the animal feed. These mixing periods to which the ingredients are to be subjected during the mixing cycle are set forth in column 4 of the table of Example 1.

While the mixer/feeder wagon has been described as comprising chopping blades which co-operate with the paddles of the paddle mixer 17, and while the provision of such chopping blades is advantageous and preferable, it is not essential, and the mixer/feeder wagon may be provided without such chopping blades. However, in the absence of chopping blades, a mixing cycle of a longer duration may be required, so that the ingredients would be subjected to greater numbers of revolutions of the paddle mixer, and additionally, since such a mixer/feeder wagon would not chop the fibrous ingredients, such fibrous ingredients would have to be pre-chopped to the desired length, prior to being loaded into the mixer/feeder wagon.

Additionally, while the mixing rotor has been described as comprising a particular type of paddle mixer, any other suitable paddle mixer, and indeed, any other suitable mixing rotor may be provided.

Additionally, while the mixer/feeder wagon has been described as comprising a dispensing compartment and a dispensing auger, the dispensing compartment and the dispensing auger may be omitted. Indeed, it will be readily apparent to those skilled in the art that any suitable mixer/feeder apparatus may be used, and while the mixer/feeder apparatus has been described as being a trailable mixer/feeder wagon, in certain cases, it is envisaged that the mixer/feeder apparatus may be self-powered, and indeed, in certain cases, may be provided by a static mixer/feeder apparatus which would be permanently ground mounted.

While a particular batch of animal feed has been described in the example with specific ingredients, specific weights of ingredients and a specific mixing regime, it will be readily apparent to those skilled in the art that other batches of animal feeds comprising other ingredients and other weights of ingredients, and also having a different mixing regime, whereby the ingredients would be loaded into the mixing compartment at different counts of revolutions of the paddle mixer than those described may be used, and the number of counts of revolutions of the paddle mixer may be different.

While the instants at which the respective ingredients are to be loaded into the mixing compartment from the commencement of the mixing cycle have been identified as being respective counts of revolutions of the paddle mixer from the commencement of the mixing cycle, the instants could be time defined if desired. However, by defining the instants at which the ingredients are to be loaded into the mixing compartment by the count of revolutions of the paddle mixer from the commencement of the mixing cycle, a more accurate mixing regime is defined, since the speed at which the rotor rotates may not be constant, and may vary from batch to batch, depending on the speed of the power takeoff shaft of the tractor or towing vehicle from which drive is provided to the paddle mixer.

While the alerting means has been described as being provided by both a strobe light and a siren, any other suitable alerting means may be provided, and in certain cases, it is envisaged that the alerting means may be provided by flashing of the visual display screen only. In other cases, it is envisaged that only one of the siren and strobe light may be provided, and most commonly only the siren would be provided.

While the device 50 according to the invention has been described for storing the ingredients and the proportions thereof of a batch of animal feed together with the mixing regime for the batch of animal feed, it is envisaged that particulars and the mixing regime of many different batches of animal feed, for the same or different animals, and/or for use in different seasons, may be stored in the device 50, and particulars of the appropriate batch and its mixing regime would be selected by inputting an appropriate select signal through the keypad of the device 50.

It is also envisaged that in certain cases, the mixing cycle complete signal which is outputted by the device 50 may be adapted and coupled to an appropriate part of the drive transmission of the mixer/feeder wagon 1 for disengaging the paddle mixer 17 from the drive, in order to stop rotation of the paddle mixer at the end of the mixing cycle. For example, the paddle mixer may be driven by the drive transmission through a clutch, which would be disengaged in response to the mixing cycle complete signal from the device 50.

While the mixer/feeder wagon has been described as comprising four load cells at respective corners of the chassis, any number of load cells may be provided, and indeed, in certain cases, it is envisaged that the housing of the mixer/feeder wagon may be supported on three load cells which would be mounted on the chassis.

While the monitoring means for monitoring the operation of the mixing rotor has been described as being a proximity sensor for effectively directly monitoring the rotation of the mixing rotor by monitoring the rotation of the third sprocket, it will be appreciated that any suitable means for monitoring the rotation of the mixing rotor may be used. Needless to say, it will be appreciated that where a proximity sensor is used, the proximity sensor may be used to monitor the rotation of any of the shafts or sprockets of the drive transmission, and the resulting value would be modified to take account of the gear ratio between the rotational speed of the mixing rotor and the shaft or sprocket or other component of the drive transmission, the rotation of which would be monitored.

The invention claimed is:

1. A device for use in conjunction with a mixer/feeder apparatus for monitoring operation of the mixer/feeder apparatus and for determining instants during a mixing cycle of a batch of animal feed at which respective ingredients of the animal feed are to be loaded into the mixer/feeder apparatus, the device comprising:
   a first storing means, the first storing means being configured to store data indicative of the identities of the respective ingredients of the batch of animal feed, the proportions of the respective ingredients required to produce the batch of animal feed, the instants during the mixing cycle of the batch of animal feed at which the respective ingredients are to be loaded into the mixer/feeder apparatus, and the duration of the mixing cycle,
   a signal processing means responsive to the stored data in the first storing means for sequentially producing first signals indicative of the identities of the ingredients and the weights thereof in the sequence in which the ingredients are to be loaded into the mixer/feeder apparatus during the mixing cycle, the signal processing means being responsive to the data stored in the first storing means and to a signal indicative of a function of mixing by the mixer/feeder apparatus for sequentially producing second signals to identify the instants at which the respective ingredients are to be loaded into the mixer/feeder apparatus during the mixing cycle, and
   a display means responsive to the first signals for sequentially displaying the identities of the ingredients in the sequence in which the ingredients are to be loaded into the mixer/feeder apparatus during the mixing cycle.

2. A device as claimed in claim 1 in which the display means is responsive to the second signals to produce respective visually perceptible signals indicative of the instants at which the respective ingredients are to be loaded into the mixer/feeder apparatus.

3. A device as claimed in claim 1 in which the signal processing means is responsive to the data stored in the first storing means and to the signal indicative of the function of mixing by the mixer/feeder apparatus for producing a mixing cycle complete signal on completion of the mixing cycle.

4. A device as claimed in claim 1 in which the signal processing means is responsive to the signal indicative of a function of mixing by the mixer/feeder apparatus which is indicative of the number of revolutions of a mixing means of the mixer/feeder apparatus for producing the second signals.

5. A device as claimed in claim 1 in which the signal processing means is responsive to the signal indicative of the function of mixing by the mixer/feeder apparatus for producing a duration countdown signal on the second signal being indicative of the instant at which the last one of the ingredients of the batch of animal feed is to be loaded into the mixer/feeder apparatus for counting down the remaining duration of the mixing cycle to the completion thereof.

6. A device as claimed in claim 5 in which the display means is responsive to the duration countdown signal for displaying the duration of the mixing cycle remaining in a countdown manner.

7. A device as claimed in claim 1 in which the signal processing means is responsive to the signal indicative of the function of mixing by the mixer/feeder apparatus for producing a first warning signal indicative of the completion of the mixing cycle being imminent.

8. A device as claimed in claim 7 in which an alerting means is provided for producing at least one of a visually perceptible signal and an aurally perceptible signal, the alerting means being responsive to the second signals for producing at least one of the visually and aurally perceptible signals to indicate the instants at which the respective ingredients are to be loaded into the mixer/feeder apparatus.

9. A device as claimed in claim 8 in which the alerting means is responsive to the mixing cycle complete signal produced by the signal processing means for producing at least one of the visually and aurally perceptible signals to indicate the completion of the mixing cycle.

10. A device as claimed in claim 9 in which the alerting means is responsive to the first warning signal produced by the signal processing means for producing at least one of the visually and aurally perceptible signals for indicating that the completion of the mixing cycle is imminent.

11. A device as claimed in claim 1 in which the signal processing means is responsive to a signal indicative of the weight of the ingredient currently being loaded into the mixer/feeder apparatus currently in the mixer/feeder apparatus for producing an amount outstanding signal indicative of the amount of the ingredient currently being loaded into the mixer/feeder apparatus which is still to be loaded therein.

12. A device as claimed in claim 11 in which the signal processing means is responsive to the signal indicative of the weight of the ingredient currently being loaded into the mixer/feeder apparatus currently in the mixer/feeder apparatus for producing an ingredient complete signal which is indicative of the current weight of the ingredient currently being loaded into the mixer/feeder apparatus being equal to the weight of that ingredient to be loaded into the mixer/feeder apparatus.

13. A device as claimed in claim 12 in which the alerting means is responsive to the ingredient complete signals produced by the signal processing means for producing at least one of the visually perceptible signal and aurally perceptible signal to indicate that the current weight of the ingredient currently being loaded into the mixer/feeder apparatus in the mixer/feeder apparatus is equal to the weight of that ingredient to be loaded into the mixer/feeder apparatus.

14. A device as claimed in claim 11 in which the signal processing means is responsive to the signal indicative of the weight of the ingredient currently being loaded into the mixer/feeder apparatus currently in the mixer/feeder apparatus for producing a second warning signal indicative of the amount of the ingredient currently being loaded into the mixer/feeder apparatus approaching the amount of that ingredient to be loaded into the mixer/feeder apparatus.

15. A device as claimed in claim 1 in which the signal processing means is responsive to the stored data stored in the first storing means and the data indicative of the number of animals for which the batch of animal feed is to be prepared for computing the weight of each ingredient to be loaded into the mixer/feeder apparatus to produce the batch of animal feed.

16. A device as claimed in claim 1 in which the signal processing means is adapted for receiving the signals indicative of the function of mixing by the mixer/feeder apparatus.

17. A device as claimed in claim 1 in which the instants during the mixing cycle at which the respective ingredients are to be loaded into the mixer/feeder apparatus are selected so that the duration of the mixing cycle remaining after the corresponding selected instant for each ingredient is substantially equal to the duration of mixing to which that ingredient is to be subjected.

18. A device as claimed in claim 1 in which a second storing means is provided for storing data indicative of the ingredients and the respective actual weights thereof in a batch of animal feed prepared in the mixer/feeder apparatus, and for storing the actual instants during the mixing cycle at which the respective ingredients were loaded into the mixer/feeder apparatus, and the actual duration of the mixing cycle.

19. A mixer/feeder apparatus comprising a housing defining a mixing compartment supported on a weighing means for weighing material in the mixing compartment, the weighing means being adapted for outputting a signal indicative of the weight of material in the mixing compartment, a mixing rotor rotatably mounted in the mixing compartment, a monitoring means for counting the number of revolutions of the mixing rotor, the monitoring means being adapted for outputting a signal indicative of a count of the number of revolutions of the mixing rotor, and a device as claimed in claim 1, the signal processing means of the device being responsive to the signal from the monitoring means for producing the second signals to identify the instants at which the respective ingredients are to be loaded into the mixing compartment during the mixing cycle.

* * * * *